US009927460B2

(12) United States Patent
Flooks et al.

(10) Patent No.: US 9,927,460 B2
(45) Date of Patent: Mar. 27, 2018

(54) CALIBRATING ROTATIONAL ACCELEROMETERS

(75) Inventors: Daniel David Flooks, Litherland (GB); Michael Edward Weaver, Barrow-in-Furness (GB)

(73) Assignee: BAE SYSTEMS plc, London (GB)

( * ) Notice: Subject to any disclaimer, the term of this patent is extended or adjusted under 35 U.S.C. 154(b) by 515 days.

(21) Appl. No.: 14/116,474

(22) PCT Filed: May 3, 2012

(86) PCT No.: PCT/GB2012/050962
§ 371 (c)(1),
(2), (4) Date: Nov. 8, 2013

(87) PCT Pub. No.: WO2012/153105
PCT Pub. Date: Nov. 15, 2012

(65) Prior Publication Data
US 2014/0083160 A1    Mar. 27, 2014

(30) Foreign Application Priority Data

May 10, 2011   (EP) .................................... 11275080
May 10, 2011   (GB) .................................... 1107759.1

(51) Int. Cl.
*G01P 21/00*   (2006.01)
(52) U.S. Cl.
CPC .................................... *G01P 21/00* (2013.01)
(58) Field of Classification Search
CPC ................................ G01P 21/00; G01P 15/00
(Continued)

(56) References Cited

U.S. PATENT DOCUMENTS 2,788,654 A * 4/1957 Wiancko ................. G01P 21/00
                                                    73/1.38
3,350,916 A * 11/1967 Bock ....................... G01C 25/00
                                                    73/1.38
(Continued)

FOREIGN PATENT DOCUMENTS

EP     1 630 562 A1    3/2006
GB     2 156 107 A     10/1985
(Continued)

OTHER PUBLICATIONS

Machine translation SU1103154.*
(Continued)

*Primary Examiner* — Helen Kwok
*Assistant Examiner* — Nashmiya Fayyaz
(74) *Attorney, Agent, or Firm* — Finch & Maloney PLLC (57) ABSTRACT

A method and system for calibrating a rotational accelerometer. The method includes attaching a rotational accelerometer to be tested to a plate fitted with and second linear accelerometers and vibrating the plate. Angular acceleration measurements from the rotational accelerometer and linear acceleration measurements from the first and second linear accelerometers are obtained during the vibrating. The linear acceleration measurements are converted into angular acceleration values, and data representing, or usable for, a comparison of the angular acceleration measurements from the rotational accelerometer and the converted angular acceleration values is generated.

20 Claims, 4 Drawing Sheets

(58) Field of Classification Search
USPC .................................... 73/1.38, 663, 1.37
See application file for complete search history.

(56) References Cited

U.S. PATENT DOCUMENTS

| | | | | |
|---|---|---|---|---|
| 4,495,433 | A | * | 1/1985 | Sheridan ............. G01P 15/0907 73/1.38 |
| 4,869,092 | A | * | 9/1989 | Bernard ................. G01P 21/00 73/1.38 |
| 2006/0005603 | A1 | * | 1/2006 | Chau ...................... G01P 21/00 73/1.38 |
| 2007/0073502 | A1 | | 3/2007 | Umeda |
| 2007/0295087 | A1 | | 12/2007 | Umeda |

FOREIGN PATENT DOCUMENTS

| | | |
|---|---|---|
| SU | 661348 | 5/1979 |
| SU | 1103154 A1 * | 7/1984 |
| SU | 1312489 A1 | 5/1987 |
| WO | 01/04640 A1 | 1/2001 |

OTHER PUBLICATIONS

European Search Report dated Nov. 7, 2011.
Great Britain Search Report dated Sep. 16, 2011.
Michael D. Insalaco, "The art of fabricating a rotational accelerometer", Sensors Magazine, Jul. 8, 2009, pp. 1-10.
Notification Concerning Transmittal of International Preliminary Report on Patentability (Forms PCT/IB/326 and PCT/IB/373) and the Written Opinion of International Searching Authority (Form PCT/ISA/237) dated Nov. 12, 2013, by the International Bureau of WIPO in International Application No. PCT/GB2012/050962. (7 pages).

* cited by examiner

CALIBRATING ROTATIONAL ACCELEROMETERS

The present invention relates to calibrating rotational accelerometers.

Rotational acceleration measurements have been a significant challenge for many years. Many parts of industry, such as the automotive industry safety development departments, require the ability to accurately measure rotational acceleration. An automobile crash, for example, has tremendous energy in the form of rotational inertia, which needs to be measured and minimised. All spring mass systems under dynamic motion can move in more than one direction, so that more than one dimension (known more commonly as a Degree Of Freedom, or DOF) may be required to completely define the motion of the mass. Up to six degrees of freedom (6DOF) are possible: three linear components (in the x, y and z planes) and rotational movement around each of these. All of these can contribute to the overall response of any spring mass assembly. Each movement or vibration component, when excited through resonance defines a mode shape; however, modes in typical structures under consideration can have complex interactions due to inherent damping. If sufficiently excited, these modes, or coupled interactions, can cause malfunctions and, in the extreme case, failure. These effects need to be measured and monitored in order to establish where these modes of resonance exist for each DOF to fully characterise a part or assembly in order to build in engineering refinement.

Measurement of linear acceleration is well established using accelerometers. These compact transducers sense a linear degree of freedom via a charge induced into a spring mounted piezoelectric crystal in line with the applied mechanical motion. The amount of charge produced by the crystal is directly proportional to the applied acceleration and can therefore be calibrated in the correct engineering units. Measurement of the mechanical vibratory motion in line with a rotational degree of freedom is not normally possible using traditional piezoelectric transduction because of the difficulty in mounting it directly onto a rotating plane; however, it can be derived from calculation between two adjacent transducers across each plane of rotation.

In order to ensure accurate measurements and to comply with international standards, periodic calibration tests of accelerometers is often required. It is known to perform calibration tests on these types of accelerometer by comparing them against linear accelerometers to calculate the rotation component which presents unavoidable errors in measurements. These tests utilise a rigid beam with stingers and two linear accelerometers, back-to-back with the rotational accelerometer. This methodology, however, has been shown to be uncontrollable without highly specialist and precision manufactured parts.

Embodiments of the present invention can address at least some of the problems discussed above. The present inventors have devised a more appropriate and accurate method for back-to-back comparison with linear accelerometers. The method can use an aluminium disc located on top of a standard vibration exciter. The method can utilise the controllable input of a vibration exciter to induce the inherent modal response of the disc to the advantage of the calibrator.

According to a first aspect of the present invention, there is provided a method of calibrating a rotational accelerometer, the method including:

attaching a rotational accelerometer to be tested to a plate fitted with first and second linear accelerometers;

vibrating the plate;

obtaining angular acceleration measurements from the rotational accelerometer during the vibrating;

obtaining linear acceleration measurements from the first and second linear accelerometers during the vibrating;

converting the linear acceleration measurements into angular acceleration values, and generating data representing, or usable for, a comparison of the angular acceleration measurements from the rotational accelerometer and the converted angular acceleration values.

The vibrating may be controlled by an input signal. The signal may be a (continuous or burst) random noise signal. The random noise signal may have a frequency range of 0-1 kHz.

The step of converting the linear acceleration measurements into angular acceleration values may use a formula:

$$x = \frac{StdA - StdB}{Dist}$$

where:

x=Angular Acceleration of combined Linear Accelerometers;

StdA=Linear acceleration measurements of the first linear accelerometer;

StdB=Linear acceleration measurements of the second linear accelerometer, and

Dist=Distance between the first and second linear accelerometers.

The linear accelerometers measurements and the rotational accelerometer measurements can be captured in blocks of time. A Hanning window function can be applied to the blocks and a Fourier Transform may then be applied to compute an average measurement in frequency domain.

According to another aspect of the present invention, there is provided a method of calibrating a rotational accelerometer, the method including:

obtaining data representing angular acceleration measurements taken by a rotational accelerometer attached to a vibrating plate fitted with first and second linear accelerometers;

obtaining data representing linear acceleration measurements taken by the first and second linear accelerometers during the vibrating of the plate;

converting the linear acceleration measurements into angular acceleration values, and generating data representing, or usable for, a comparison of the angular acceleration measurements from the rotational accelerometer and the converted angular acceleration values.

According to yet another aspect of the present invention there is provided a computer program product comprising computer readable medium, having thereon computer program code means, when the program code is loaded, to make the computer execute a method substantially as described herein.

According to a further aspect of the present invention there is provided a system adapted to calibrate a rotational accelerometer, the system including:

a plate fitted with first and second linear accelerometers, in use, a rotational accelerometer to be tested being attached to the plate;

a device for vibrating the plate;

a processing device configured to obtain angular acceleration measurements from the rotational accelerometer during the vibrating, obtain linear acceleration measurements from the first and second linear accelerometers during the vibrating, and convert the linear acceleration measurements into angular acceleration values, the processing device further configured to generate data representing, or usable for, a comparison of the angular acceleration measurements from the rotational accelerometer and the converted angular acceleration values.

The first and second linear accelerometers may be fitted within recesses in the plate. In some embodiments the disc may be fitted with at least two pairs of said first and second linear accelerometers. The pairs may be arranged such that weights of the pairs are distributed equally across diametrically opposed regions of the plate. The plate may include recesses/channels for accommodating leads from the accelerometers to the processing device.

The vibrating may be attached to, or adjacent, a central region of the plate. At least one stud mount may be used to attach the vibrating device to the plate. In one embodiment three stud mounts arranged equidistant from the central region of the plate to attach it to the vibrating device.

The plate may comprise a disc formed of aluminium.

The device for vibrating may comprise a vibrational shaker.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to the practitioners skilled in the art. Furthermore, it is contemplated that a particular feature described either individually or as part of an embodiment can be combined with other individually described features, or parts or other embodiments, even if the other features and embodiments make no mention of the particular feature. Thus, the invention extends to such specific combinations not already discussed.

The invention may be performed in various ways, and, by way of example only, an embodiment thereof will now be described, reference being made to the accompanying drawings in which.

Figure 1:
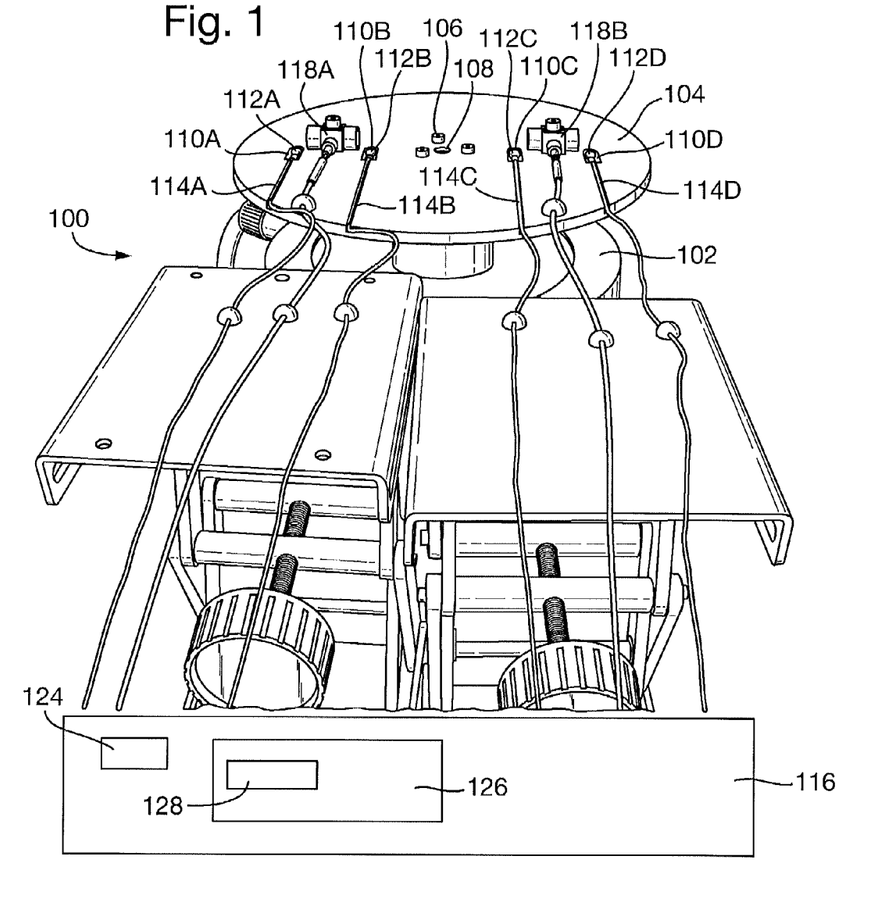
FIG. 1 shows an example calibration system including an aluminium disc.

FIG. 1 shows an example calibration system 100 including a vibrational shaker 102. Examples of suitable shakers include the SignalForce V20 shaker, produced by Data Physics of San Jose, Calif., USA, fitted with an in line force gauge, and the Vibration Exciter 4808. produced by Brüel & Kjaer of Naerum, Denmark. Attached to the shaker is a plate in the form of an aluminum disc 104. Aluminium is strong enough to flex and not snap or break; it is also cheap enough to manipulate in the manufacturing process and readily available. It will be appreciated that different materials, such as stiff carbon fibre, may be used in alternative embodiments. A generally central region of the disc is rigidly attached to the shaker. In the illustrated example this attachment is achieved by means of three stud mounts 106, which are arranged as points of an equilateral triangle around a central aperture 108 in the disc; however, it will be understood that other methods of rigidly fixing the disc to the shaker may be used, e.g. a single bolt through the centre.

The upper surface of the disc 104 is generally flat/smooth, but includes four recesses 110A-110D. All four recesses are arranged in a line that passes through the central aperture 108 of the disc. The recesses 110A, 110B form a left-hand pair in the Figure and the recesses 110C, 110D form a right-hand pair. The recesses in each pair are spaced apart by a distance of 43.99 mm in one example embodiment. Within each recess there is fitted a linear DOF accelerometer 112A-112D, such as Sensonics QZP accelerometers or PCB Miniature, lightweight (0.5 g), ceramic shear ICP™ accelerometers, with a nominal sensitivity of 10 mV/g. The linear accelerometers will be pre-configured and used as standards for the calibration of a rotational accelerometer. The linear accelerometers can be held in place with wax as this is strong enough for the level of vibration the disc will experience, with their upper surfaces being generally flush with the upper surface of the disc. The outline of each recess 110 generally follows the outline of the linear accelerometer 112. Leads 114A-114D from the linear accelerometers can be fed out through recessed lines on the supper surface of the disc (and may be held down by an adhesive substance such as BluTac™) and are connected to a computing device 116.

Figure 2:
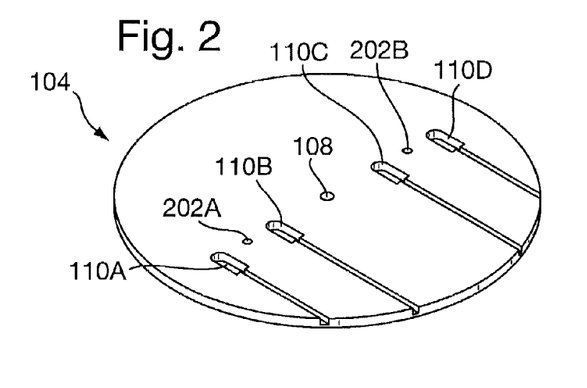
FIG. 2 shows the aluminium disc in more detail.

The disc 104 is shown in more detail in FIG. 2, without any accelerometers fitted. Midway between each pair of recesses 110A, 110B and 110C, 110D there is a respective aperture 202A, 202B in the disc. As shown in FIG. 1, each of these apertures can be used to securely mount a rotational DOF accelerometer 118A, 118B, such as a Kistler 8838/8840 Rotational Accelerometer, which is a shear mode piezoelectric accelerometer capable of measuring axial/lateral rotational DOF directly applied to its base. Its transducer incorporates built in electronics to produce a low impedance voltage output directly proportional to the induced rotational motion. Leads 120A, 120B connect the rotational accelerometers 118A, 118B to the computing device 116. The illustrated set up means that the weight of the two pairs of linear/rotational accelerometers is distributed equally on both halves of the disc. It is possible to calibrate up to two rotational accelerometers using this set up. For brevity, the calibration process for one rotational accelerometer only (118A) will be described below.

The disc 104 can be theoretically sliced into an infinite number of beams around its circumference. Any one of these beams along its radii can be utilised to position two single axis linear DOF accelerometers and the rotational accelerometer in-line. The aluminium disc will have inherent but damped mode shapes at resonant enhancements with rotational components. Full modal analysis can be performed via finite element analysis in order to identify its mode shapes, but for calibration a controlled excitation of flexible vibration features will be suitable for the back-to-back calibration with the linear DOF accelerometers.

When the vibrational shaker 102 is excited the modal response of the disc 104 will cause it to flex and rotate. This excitation response can be used in a controlled manner to take measurements along the arc of the disc. Three measurements can be taken: two from the linear accelerometers 112A, 112B and one from the rotational accelerometer 118A. Measurements from the linear accelerometers can be combined and computed to derive rotational or angular acceleration by subtracting the two direct measurements and dividing by the distance between the linear accelerometers. This computed measurement can then be compared to the directly measured angular acceleration from the in plane rotational accelerometer under calibration test. In order to make accurate measurements, the calculation process works on the overall or time domain data, but the results and calibration can be expressed in the frequency domain via Fourier transform post processing.

The computing device 116 includes a processor 124 and memory 126. Other common elements of the computing device, e.g. display, external storage, communications means and user interface means, are well known and are not shown or described for brevity. The memory 126 includes an application 128 for assisting with calibrating the rotational accelerometers.

Figure 3:
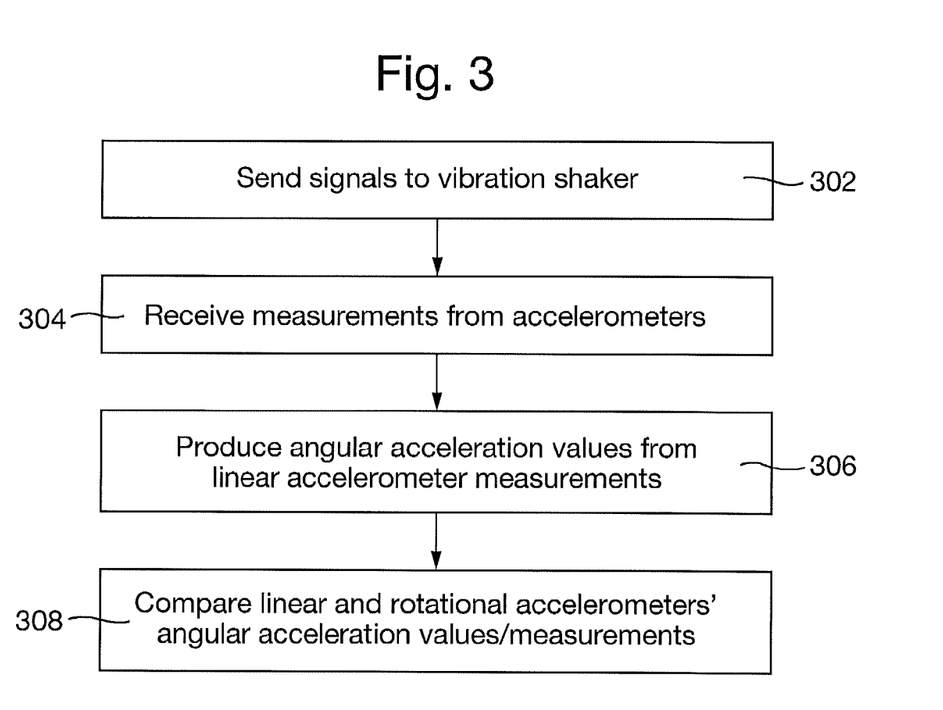
FIG. 3 is a flowchart showing steps performed using the calibration system.

FIG. 3 shows examples of steps performed by the calibration assistance application 128. It will be appreciated that in alternative embodiments, some of these steps may be omitted or re-ordered. The application 128 may be implemented using more than one software modules and in some embodiments it may use the Signal Calc software produced by Data Physics to perform some of the illustrated steps. At step 302 a continuous random signal from 0-1 kHz is fed to the shaker via a matched power amplifier. It will be understood that in alternative embodiments the frequency and nature of the signal may vary, e.g. noise bursts or signals with a slower sweep may be transmitted. In the example embodiment, a frequency span of DC—1 kHz is appropriate in terms of capturing the most significant flexible modes of the disc and the typical range of consideration for rotational components. A random signal can be output, which is a broadband excitation (essentially) white noise, exhibiting uniform spectral density and having no tonal content across the frequency span. This signal type has a crest factor of approximately 5 and a (near) Gaussian amplitude distribution about a mean zero.

At step 304 measurement data generated by the linear 112A, 112B and rotational 118A accelerometers during the vibration of the disc is received by the computing device 116. The data can be captured in "blocks" of time every 800 ms with a sample period of 390.6 μSec, for example. A Hanning window function can be applied to each block, forcing the data to zero at the start and end of each 800 ms capture period and allowing the Fourier Transform to be completed correctly and with maximum amplitude accuracy. Each time block can be used in this way to compute one average in the frequency domain (via Fourier Transform). An exponential averaging algorithm can provide a time weighted moving average where the current frame is weighted most heavily and the influence of older frames (or averages) decays exponentially. This type of averaging is equivalent to analogue RC smoothing and normalises the data points but allows any time-variant phenomena to be tracked or noted.

Figure 4:
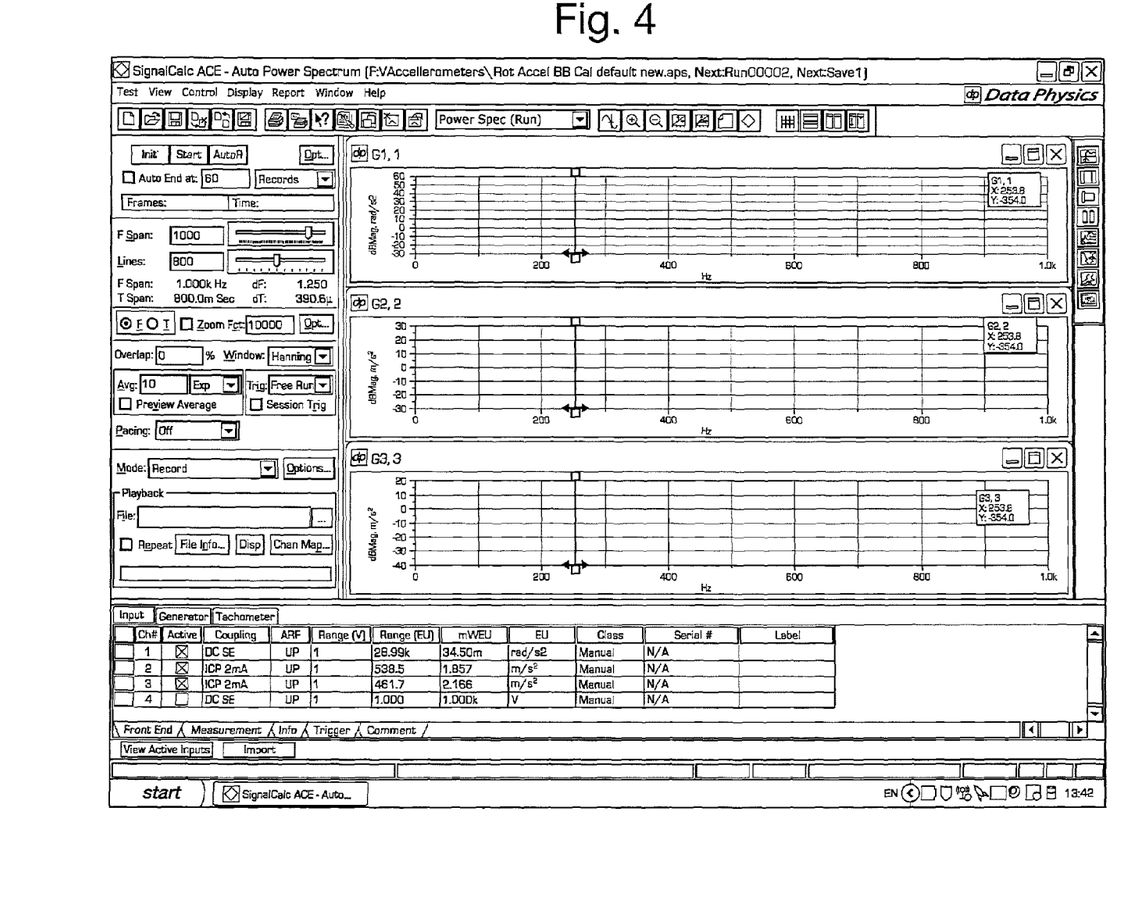
FIG. 4 is an example screen display of a software application used by the system.

The averaged spectral content for each transducer for the accelerometers can be displayed. An example screen display is shown in FIG. 4, which also shows set up parameters available in the Signal Calc front end. Individual sensitivities can be taken into account for each transducer and entered to ensure accurate measurement and follow on processing. With a sensible number of data blocks averaged and collected to ensure data quality, further processing of the data can be carried out, which may involve manipulation of the streamed time histories using software other than Signal Calc. This can involve carrying out basic mathematical processing on individual signals, assigning engineering units and calculate the final averaged Fourier transform. Calculations can be performed in the time domain with the raw time domain data captured via the Signal Calc software. At step 306 the application 128 is configured to produce an equivalent angular acceleration from the captured linear data for comparison and output of the final sensitivity. In some cases the program may only compute simple processes in steps and the final output may therefore be derived in two stages. The output required to compute angular acceleration from the linear data at known distances on the disc is shown in the formula below:

$$x = \frac{StdA - StdB}{Dist}$$

where:
x=Angular Acceleration of combined Linear Accelerometers;
StdA=Linear acceleration measurements of the first linear accelerometer;
StdB=Linear acceleration measurements of the second linear accelerometer, and
Dist=Distance between the first and second linear accelerometers.

The individual channels can be captured as a 50 second time block and for the first stage a calculation combines the two linear signal by multiplication and assigns this calculated data to a new channel (in terms of acceleration $m/s^2$). Stage two of the process divides this new channel data by the fixed distance and then creates a further channel as angular acceleration. This final time channel can then be processed and averaged into the frequency domain using parameters identical to those used by the Signal Calc software.

Figure 5:
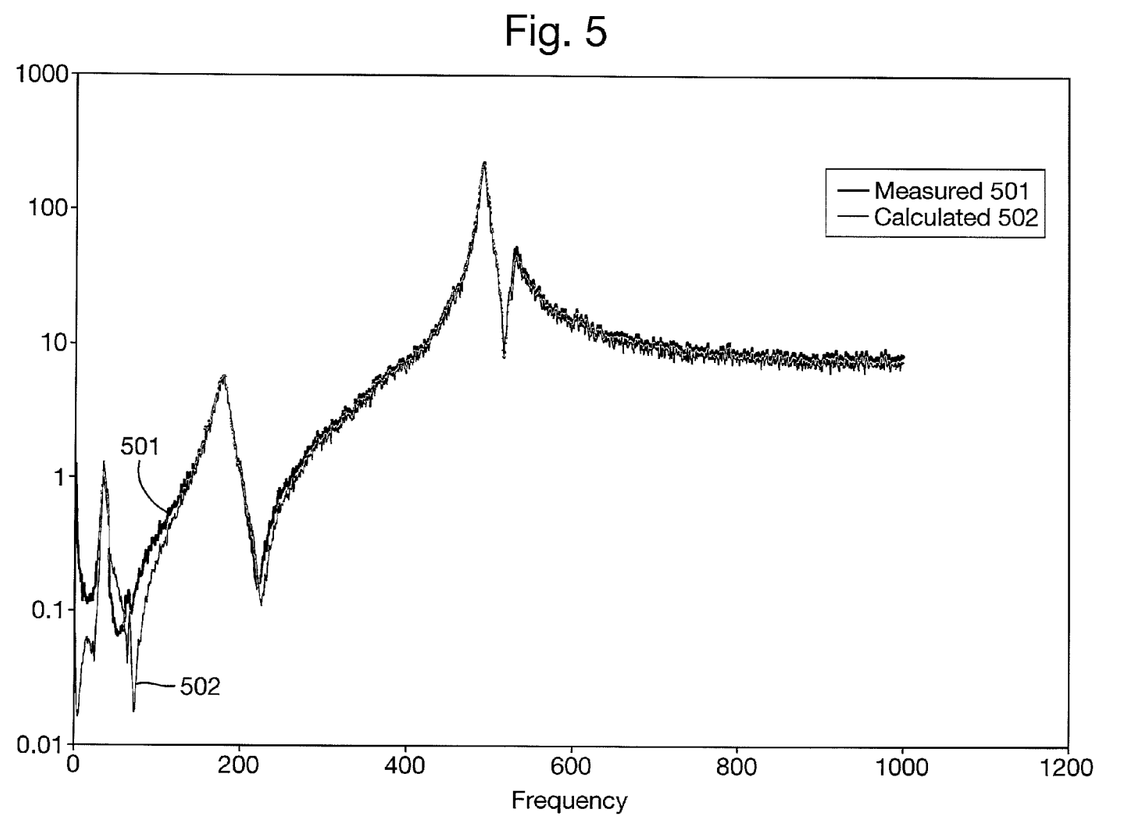
FIG. 5 is a graph showing angular acceleration values measured during example operation of the system.

When calculation is complete, both directly measured and calculated averaged frequency domain data can be used to compare the measurements taken by the linear and rotational accelerometers (step 308 of FIG. 3). For example, the data may be exported as ASCII format files to continue processing and verification in Microsoft Excel™. The data files can be compared and analysed in adjacent columns for percentage difference and thus used to calibrate the rotational accelerometer. A graphical display may be produced to show the characteristics and visual match of both signals. The frequency at which the sensitivity was taken in the example is 600 Hz, although in practice a number of frequency points on this curve will be used. FIG. 5 is an example graph, which shows that the measured value from the rotational accelerometer is very close to the trend of the calculated linear accelerometers. Both signals are, however, inherently unstable at the lowest frequencies and tend to flatten off. This is believed to be due to the disc and its mounting setup. However, both values show the same trend which validates the consistency of the testing method.

Prior to using the disc for calibrating rotational accelerometers, modal analysis was carried out on a prototype disc in order to identify its flexible mode shapes and ensure a more controlled calibration. Testing in this way was used to confirm that the degrees of freedom expressed as mode shapes in terms of magnitude "peaks" were true flexible shapes of the disc and would be usable for repeatable comparisons needed in calibration. It was considered that this process would also aid in the final manufacture of the disc that provides a more accurate calibration. In this procedure, the disc was rigidly mounted via its centre hole to a SignalForce V20 shaker fitted with an in line force gauge. A continuous random signal from 0-1 kHz, was input from Data Physics Signal Calc software on a laptop computer, and fed to the shaker via a matched power amplifier. Dynamic response from the accelerometers and force gauge was filtered with a Hanning window and then sampled and averaged in time blocks using 50% overlap. Data was initially taken in the time domain and instantaneously transformed into the frequency domain over a 0-1 kHz span with a sampling time of 3.2 seconds and averaged over 50 samples. A frequency response in terms of Inertance (response per unit force input) was viewed as logarithmic modulus data and respective coherence graphs (the degree of linear dependence between input and output locations) with the force transducer as the reference position.

As a secondary check for modal response, and to ensure that locating the disc on top of the shaker had not introduced any undesirable effects, hammer tests were conducted on the disc in order to verify its "free" mode shapes (at modulus "peaks"). The disc was suspended using a "bungee" cord through its central mounting hole. Taps were made using a plastic tip fitted to a 'PCB' modal response hammer such that a coherent frequency response up to 1 kHz could be identified. This impulsive input testing required a slightly different processing technique from the continuous and controllable random input of the shaker exciter system. For these tap tests the hammer was lightly struck on the edge of the disc directly opposite to the position of the accelerometers as well as in the centre of the test piece near to the mounting hole. Data was gathered in two or three samples averaged without windowing and using a suitable time block (on each data sample) for the response to fully decay. This technique confirmed that the main flexible modes were matched with the shaker excitation, although lower frequency "global" features could be attributed to the fixed mounting.

A model of the disc was also created in ABACUS CAE and a natural frequency analysis was conducted in order to more fully consider the behaviour of the prototype disc. For the simplicity of the model, the accelerometers were considered as combined point masses and rotational inertance. The centre of the disc was rigidly mounted and the edge was free. The aim of this Finite Element (FE) analysis was to gain an understanding of the approximate frequencies for the first 5 modes, and the order in which these modes appear.

From the FE model it was determined that resonances below 150 Hz were unlikely to be flexible modes and modulus "peaks" below that frequency were more likely to be free body modes of the plate and shaker assembly. These lower frequency effects as described were not evident for the low frequency data measured during the suspended tap check described above and helped confirm they were global system responses. Above this low frequency region, the expected order of the modes was the same as determined from the model, which then leads to the assumption that the first two modes are at 211 Hz and 230 Hz. While this was lower than predicted in the model it could be explained by a difference in the boundary conditions. As the first two modes were simple flexible bending modes then any change in the mounting stiffness will have a large effect on the position of these modes. This lack of repeatability may be why these modes were considered difficult for calibration exercises for this set up. The next mode was predicted to be the drum skin mode which was not particularly active. Above this frequency range this there was a large peak at approximately 650 Hz (not predicted by the FE model). Also, it was absent from the Average Auto Power Spectrum for each accelerometer alone (which will be the spectrum used for calibration). Another abnormality in relation to this resonance was that the power spectrum of the force signal showed that at this input the force went to almost zero. All of these considerations lead to the idea that this peak is actually the result of an antinode at the centre of the disk, i.e. almost no force is required to achieve the required amplitude of vibration at that frequency.

The method described herein is advantageous compared to the earlier calibration test described mentioned above as the vibration exciter and control software that is already utilised for back-to-back calibration of linear accelerometers can be simply modified by the addition of a disc to induce controllable and repeatable rotational motion.

The invention claimed is:

1. A method of calibrating a rotational accelerometer, the method including:
   attaching a rotational accelerometer to be tested to a plate fitted with first and second linear accelerometers;
   rigidly attaching the plate to a non-rotating vibrational shaker configured to vibrate the plate;
   applying a noise signal to excite the vibrational shaker to induce an inherent modal response of the plate thereby causing the plate to vibrate;
   obtaining angular acceleration measurements from the rotational accelerometer during the vibrating;
   obtaining linear acceleration measurements from the first and second linear accelerometers during the vibrating;
   converting the linear acceleration measurements into angular acceleration values; and
   generating data representing, or usable for, a comparison of the angular acceleration measurements from the rotational accelerometer and the converted angular acceleration values.

2. The method according to claim 1, wherein the noise signal is a continuous or burst random noise signal.

3. The method according to claim 2, wherein the random noise signal has a frequency range of 0-1 kHz.

4. The method according to claim 1, wherein the converting of the linear acceleration measurements into angular acceleration values uses a formula:

$$x = \frac{StdA - StdB}{Dist}$$

where:
x=Angular Acceleration of combined Linear Accelerometers;
StdA=Linear acceleration measurements of the first linear accelerometer;
StdB=Linear acceleration measurements of the second linear accelerometer, and
Dist=Distance between the first and second linear accelerometers.

5. The method according to claim 4, comprising:
capturing the linear accelerometers measurements and the rotational accelerometer measurements arc captured in blocks of time.

6. The method according to claim 5, comprising:
applying a Hanning window function to the blocks and then applying a Fourier Transform to compute an average measurement in frequency domain.

7. A system configured to calibrate a rotational accelerometer, the system comprising:
a plate configured to be fitted with first and second linear accelerometers, and further configured to test a rotational accelerometer attached to the plate;
a non-rotating vibrational shaker rigidly attached to the plate and configured to vibrate the plate; and a processing device configured to apply a noise signal to excite the vibrational shaker to induce an inherent modal response of the plate thereby causing the plate to vibrate, obtain angular acceleration measurements from the rotational accelerometer during the vibrating, and to obtain linear acceleration measurements from the first and second linear accelerometers during the vibrating, and to convert the linear acceleration measurements into angular acceleration values, the processing device being further configured to generate data representing, or usable for, a comparison of the angular acceleration measurements from the rotational accelerometer and the converted angular acceleration values.

8. The system according to claim 7, wherein the plate comprises a plurality of recesses each configured to be fitted with the first and second linear accelerometers.

9. The system according to claim 7, wherein the plate is configured to be fitted with at least two pairs of said first and second linear accelerometers.

10. The A system according to claim 9, wherein the plate is configured such that weights of the at least two pairs of the first and second linear accelerometers are distributed equally across diametrically opposed regions of the plate.

11. The A system according to claim 7, wherein the plate comprises:
recesses/channels configured to accommodate leads from the first and second linear accelerometers to the processing device.

12. The system according to claim 7, wherein the vibrational shaker is attached to a central region of the plate.

13. The A system according to claim 12, comprising:
at least one stud mount configured to attach the vibrational shaker to the plate.

14. The A system according to claim 13, comprising:
three threaded stud mounts arranged equidistant from the central region of the plate and configured to attach the plate to the vibrational shaker.

15. The A system according to claim 7, wherein the plate comprises:
a disc formed of aluminum.

16. A rotational accelerometer calibration kit, the kit comprising:
a plate configured to be fitted with first and second linear accelerometers, and further configured to test a rotational accelerometer attached to the plate;

a non-rotating vibrational shaker configured to rigidly attach to the plate and to vibrate the plate; and a processing device configured to apply a noise signal to excite the vibrational shaker to induce an inherent modal response of the plate thereby causing the plate to vibrate, obtain angular acceleration measurements from the rotational accelerometer during the vibrating, and to obtain linear acceleration measurements from the first and second linear accelerometers during the vibrating, and to convert the linear acceleration measurements into angular acceleration values, the processing device being further configured to generate data representing, or usable for, a comparison of the angular acceleration measurements from the rotational accelerometer and the converted angular acceleration values.

17. The system according to claim 8, wherein the plate is configured to be fitted with at least two pairs of said first and second linear accelerometers.

18. The A system according to claim 17, wherein the plate is further configured such that weights of the at least two pairs of the first and second linear accelerometers are distributed equally across diametrically opposed regions of the plate.

19. The system according to claim 7, wherein the plate comprises:
recesses/channels configured to accommodate leads from the first and second linear accelerometers to the processing device.

20. The system according to claim 7, wherein the vibrational shaker is attached to a central region of the plate.

* * * * *